(12) United States Patent
Tamaki

(10) Patent No.: US 6,388,771 B1
(45) Date of Patent: *May 14, 2002

(54) IMAGE INPUT DEVICE FOR SENDING IMAGE DATA TOGETHER WITH INFORMATION INDICATING CONTENTS OF DESIRED OPERATION TO BE PERFORMED ON THE IMAGE DATA

(75) Inventor: Shunpei Tamaki, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,153

(22) Filed: Sep. 22, 1997

(30) Foreign Application Priority Data

Sep. 24, 1996 (JP) ............................................. 8-271314

(51) Int. Cl.$^7$ ................................................. H04N 1/40
(52) U.S. Cl. ....................................... 358/442; 358/468
(58) Field of Search ................................ 358/400, 401, 358/468, 474, 442

(56) References Cited

U.S. PATENT DOCUMENTS

| | | | |
|---|---|---|---|
| 5,051,820 A | * | 9/1991 | Sasaki ......................... 358/500 |
| 5,357,350 A | * | 10/1994 | Matsunai ..................... 358/468 |
| 5,623,285 A | * | 4/1997 | Aharonson ................... 358/474 |
| 6,178,004 B1 | * | 1/2001 | Ochiai ........................ 358/1.14 |

FOREIGN PATENT DOCUMENTS

| | | | | |
|---|---|---|---|---|
| JP | 583450 | | 4/1993 | ............ H04N/1/00 |
| JP | 6500446 | | 1/1994 | ............ H04N/1/00 |
| JP | 06214922 A | * | 8/1994 | ........... G06F/15/62 |
| JP | 750736 | | 2/1995 | ............ H04N/1/00 |
| JP | 9-247390 | * | 9/1997 | ........... G06F/15/64 |

* cited by examiner

Primary Examiner—Jerome Grant, II
(74) Attorney, Agent, or Firm—Cooper & Dunham LLP

(57) ABSTRACT

An image input device is provided which can instruct a host computer to perform a cleared process with respect to image data obtained by scanning without a user's instruction being input to the host computer. The image input device is adapted to be connected to a host computer so as to transfer image data to the host computer. An instruction with respect to what process is to be applied to the image data by the host computer is input to the image input device by the user. The content of the instruction is announced to the host computer when the image data is transferred to the host computer.

13 Claims, 10 Drawing Sheets

FIG.3

| OPERATION CODE | IMAGE RESOLUTION(dpi) | | NUMBER OF GRADATION LEVELS |
| --- | --- | --- | --- |
| | PRIMARY SCANNING | SECONDARY SCANNING | |
| COPY | 400 | 400 | 64 |
| FAX | 200 | 200 | 2 |

IMAGE INPUT DEVICE FOR SENDING IMAGE DATA TOGETHER WITH INFORMATION INDICATING CONTENTS OF DESIRED OPERATION TO BE PERFORMED ON THE IMAGE DATA

BACKGROUND OF THE INVENTION

1. Field of the Invention

The present invention generally relates to image input devices and, more particularly, to an image inputting device such as an image scanner which reads an image and transfers image data to a computer via an interface.

2. Description of the Related Art

In recent years, a data/FAX modem has become popular as a peripheral device of a personal computer. Additionally, a computer system can be easily constructed at a low cost which includes a plurality of image processing devices, such as a copy machine, a facsimile machine, a printer and/or a scanner. In such a computer system, an image input device such as a scanner and an image output device such as a printer are connected to a personal computer so that transfer of the data between the image input device and the image output device can be performed via the personal computer which serves as a host computer.

Particularly, a client server system has rapidly become popular in the office business field. The client server system realizes the above-mentioned computer system in which a scanner and a printer are connected to a server computer as a host computer so that a large load is not put on a client computer as a user's terminal.

In the above-mentioned multifunctional system, various functions can be provided by settings provided from the host computer. However, there is a problem in that user's operations are extremely inconvenient since most of the setting operations are performed on the host computer. Specifically, the following procedures must be taken, for example, when a copy function is used in the above-mentioned multifunctional system in that:

(1) setting an original document on the scanner;
(2) inputting an instruction through the host computer so as to read an image on the original document by the scanner;
(3) inputting an instruction through the host computer so as to perform a printing operation by the printer; and
(4) collecting the original document on the scanner and the printed copy on the printer.

On the other hand, when a copy is made by a stand alone copy machine, the following simple procedure is enough:

(1) setting an original document on a scanner unit of the copy machine;
(2) pressing a copy key on the copy machine (reading and printing operations are automatically performed by the copy machine); and
(3) collecting the original document and the printed copy on the copy machine.

The printing operation performed by the stand alone copy machine is much more simple than the printing operation performed by the multifunctional computer system. Similarly, when a facsimile function is used, an operation of a stand alone facsimile machine is much more simple than an operation of the multifunctional computer system.

As mentioned above, the stand alone copy machine is previously set so that image data obtained by the scanner unit is automatically output by a printing unit. Similarly, the standalone facsimile machine is previously set so that image data obtained by scanning an original document is automatically sent to a remote terminal. Accordingly, in the stand alone copy machine or the stand alone facsimile machine, the user is not required to instruct a process to be performed on the image data obtained by the scanner unit. In other words, when the stand alone copy machine or the stand alone facsimile system is used, the desired process performed on the image data obtained by scanning the original document is previously input in the stand alone machine. Thus, the stand alone machine is superior to the multifunctional system with respect to operability.

On the other hand, in the multifunctional computer system which includes a host computer as mentioned above, the image data transferred to the host computer from the scanner can be output to either the modem or the printer. That is, the host computer must be instructed by the user as to which peripheral device the image data is output. In most cases, the user has a specific intention for use of the image data (for example, use for copy or facsimile transmission), at the time when the original document is scanned by the scanner.

However, the user is requested to input the contents of the desired process to the host computer. That is, the user must input an instruction to the host computer as to whether the image data transferred to the host computer should be output to a printer or a remote terminal via the modem. Thus, there is a problem in that the operation is complex and inconvenient.

SUMMARY OF THE INVENTION

It is a general object of the present invention to provide an image input device in which the above-mentioned problems are eliminated.

A more specific object of the present invention is to provide an image input device which can instruct a desired process to a host computer with respect to image data obtained by scanning by the image input device without a user's instruction being input to the host computer.

In order to achieve the above-mentioned objects, there is provided according to the present invention an image input device adapted to be connected to a host computer so as to transfer image data to the host computer, the image input device comprising:

means for inputting an instruction with respect to a process to be applied to the image data by the host computer; and means for announcing contents of the instruction to the host computer.

According to the above-mentioned invention, the image input device is provided with means for inputting an instruction to perform a desired operation on the image data so as to announce to the host computer 2 as to which operation, for example, a copying operation or a facsimile transmission, is requested by the user. Accordingly, the user is not required to directly work on the host computer 2 to instruct the desired operation to be performed. Thus, the operation done by the user is simplified, resulting in a convenient use of the system including the image inputting device.

In one embodiment of the present invention, the means for announcing may include means for setting an operation code which represents contents of the instruction so that the operation code is sent to the host computer. Additionally, the operation code is sent to the host computer prior to sending the image data.

The image input device according to the present invention may further comprise:

means for setting at least one of a resolution and a number of gradation levels of the image data in accordance with the contents of the instruction; and means for announcing to the host computer the one of the resolution and the number of gradation levels set by the means for setting.

According to the above-mentioned invention, since the resolution and the number of gradation levels of the image data can be automatically set in accordance with the contents of the user's instruction for the operation, an appropriate resolution and the number of gradation levels can be selected for the operation, such as a copying operation or a facsimile transmission, to be performed.

The image input device according to the present invention may further comprise means for preparing file data which comprises the image data and a header so that the file data is sent to the host computer, the header including an operational code which indicates the contents of the instruction. Additionally, the header may further include information with respect to at least one of a resolution and a number of gradation levels of the image data.

According to the above-mentioned invention, the image data is sent to the host computer together with the information which indicates the operation to be performed on the image data and the resolution and/or the number of gradation levels of the image data. Thus, an appropriate operation can be performed on the image data by the host computer without an instruction of the user being input to the host computer.

In one embodiment according to the present invention, the means for inputting comprises a copy key and a facsimile key, the copy key being pressed when the image data is for a copying operation, the facsimile key being pressed when the image data is for a facsimile transmission.

Additionally, there is provided according to another aspect of the present invention, an image input device adapted to be connected to a host computer so as to transfer image data to the host computer, the image input device comprising:

ten keys which represent a number from zero to nine, the ten keys being used for inputting an address number of a remote terminal to which image data is transferred by a facsimile transmission;

means for determining that the operation to be applied to the image data is a facsimile transmission when one of the ten keys is pressed before a reading operation is started; and means for announcing to the host computer a result of a determination made by the means for determining.

Additionally, the means for determining may further determine that the operation to be applied to the image data is a copying operation when the reading operation is started without an input from the ten keys.

According to the above-mentioned invention, it is determined that the user requests a facsimile transmission when one of the ten keys is pressed before the image data is obtained. Thus, when the operation to be performed on the image data is a facsimile transmission, the user is not required to input the instruction indicating the facsimile operation being performed. Thus, there is no need for the user to work on either the image input device to the host computer to instruct what operation is to be performed after the user sets an original document in the image input device. Thus, the operation done by the user is simplified and convenient.

Other objects, features and advantages of the present invention will become more apparent from the following detailed description when read in conjunction with the accompanying drawings.

BRIEF DESCRIPTION OF THE DRAWINGS

FIG. 3 is an illustration of table information containing image resolution and a number of gradation levels with respect to each operation code;

DETAILED DESCRIPTION OF THE PREFERRED EMBODIMENTS

A description will now be given of a first embodiment according to the present invention.

Figure 1:
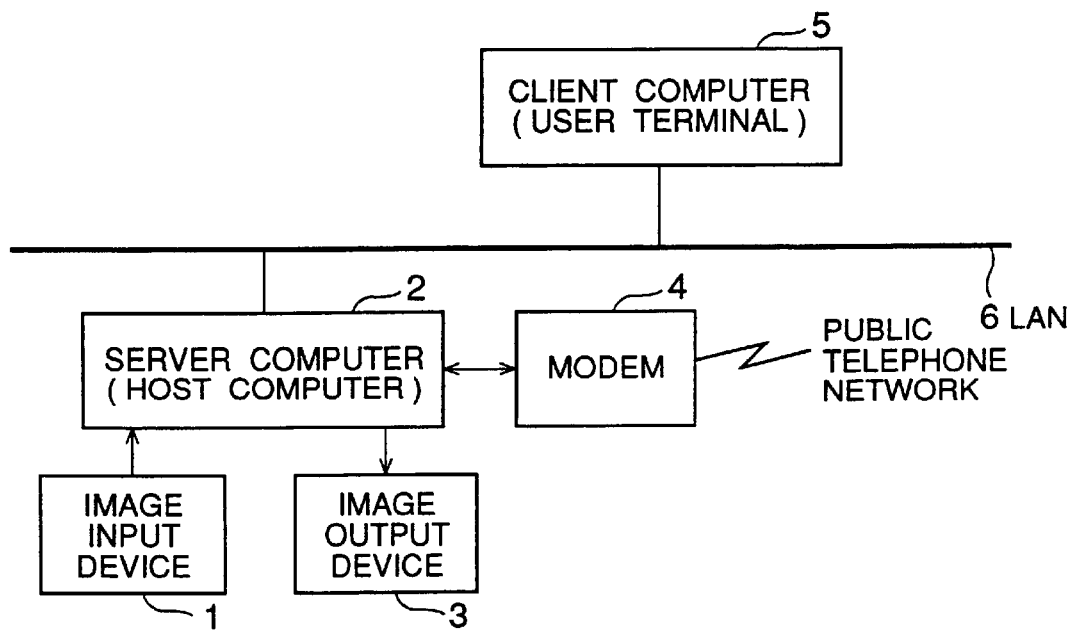
FIG. 1 is an illustration of a system in which an image input device according to a first embodiment of the present invention is provided.

FIG. 1 is a block diagram of a system which includes an image input device according to the first embodiment of the present invention. In FIG. 1, a server computer 2 and a client computer 5 are connected to a local area network 6. A plurality of the client computers 5 may be connected to the local area network 6.

The image input device 1, an image output device 3 and a modem 4 are connected to the server computer 2 performing as a host computer. The modem 4 is connected to the server computer 2 via an RS232C asynchronous serial interface. A bidirectional parallel interface may be used instead of the RS232C interface. The modem 4 transfers to the host computer 2 normal data received via a public telephone network or facsimile data after demodulation. Additionally, the modem 4 modulates normal data or facsimile data transferred from the host computer 2 and sends the modulated data to a remote terminal via the public telephone network.

The image output device 3 performs a recording of image data which is transferred from the server computer 2. The image output device 3 performs the recording operation with a high resolution such that the primary scanning of 400 dpi and secondary scanning of 400 dpi and a gradation resolution 6 bits (64 gradations).

Figure 2:
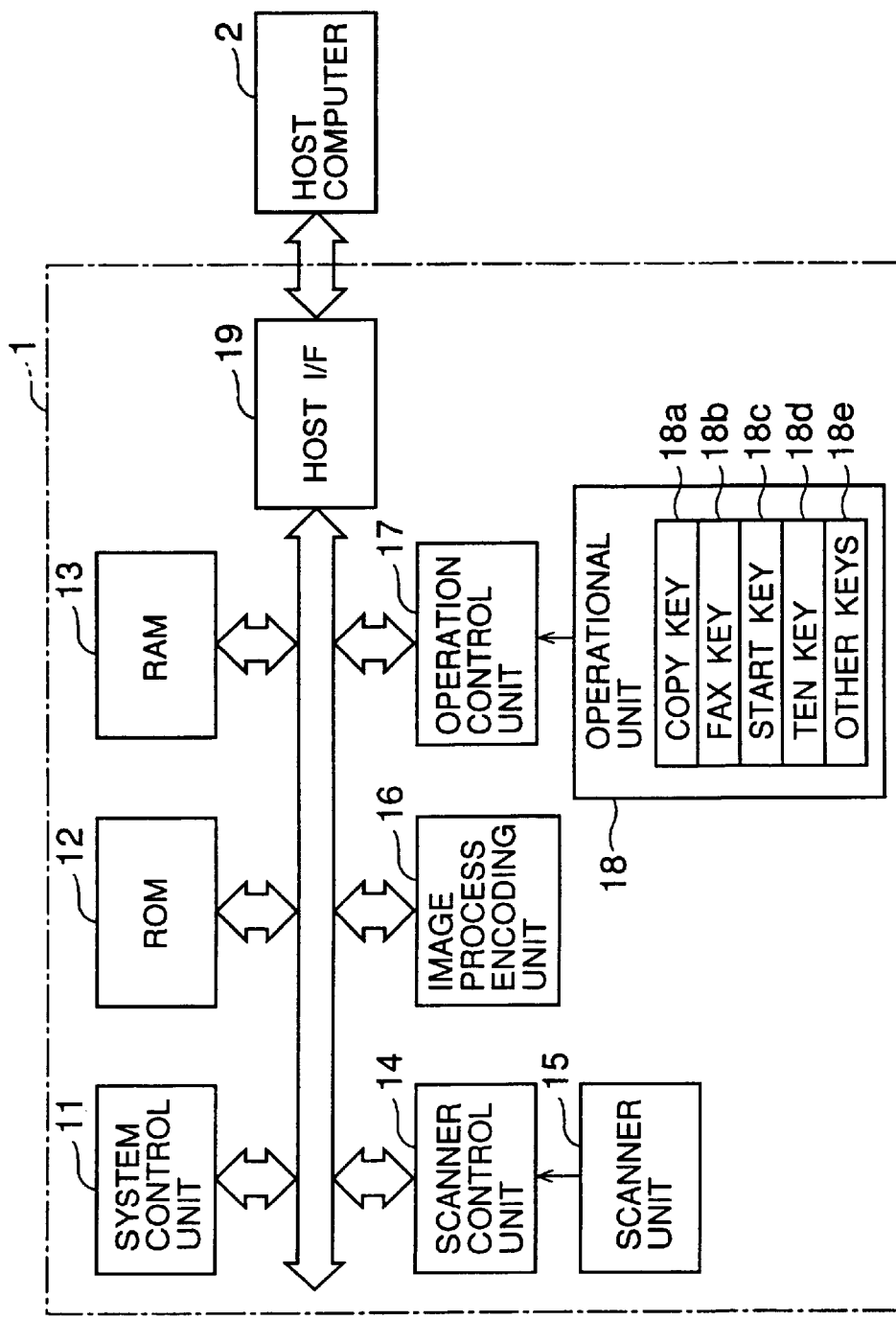
FIG. 2 is a block diagram of the image input device shown in FIG. 1.

The image input device 1 is provided for inputting image data to the host computer 2. FIG. 2 is a block diagram of the image input device 1.

In FIG. 2, a system control unit 11 is provided by a microcomputer which controls each section of the system. The microcomputer controls each section of the system by using a RAM 13 in accordance with control procedure stored in a ROM 12. It should be noted that ROM 12 stores an information table shown in FIG. 3 which will be described in detail later.

A scanner control unit 14 controls a reading operation of a scanner unit 15. The scanner unit 15 is a monochrome type scanner which performs a reading operation with a reading resolution of 300 dpi and a gradient resolution of 8 bits (256 gradation levels). An image process encoding unit 16 corrects image data obtained by the scanner unit 15, and encodes the image data.

An operation control unit 17 reads a key input signal from an operational unit 18, and the contents of the key input signal to the system control unit 11. The operational unit 18 is provided with various keys so that a user can input various instructions through the keys. The keys includes a copy key 18a, a FAX key 18b, a start key 18c, ten keys 18d and other keys 18e.

The scanner unit 15 obtains image data in accordance with an instruction input through the operational unit 18 by a user. The image data obtained by the scanner unit 15 is sent to the host computer 2 via a host I/F 19 in accordance with a control of the system control unit 11. The host computer 2 receives the image data, and temporarily stores the image data in a memory device such as a hard disc. The image data can be output to either the modem 4 or the image output device 3.

A description will now be given, with reference to FIG. 4, of an operation performed by the image input device 1 according to the first embodiment of the present invention.

Figure 4:
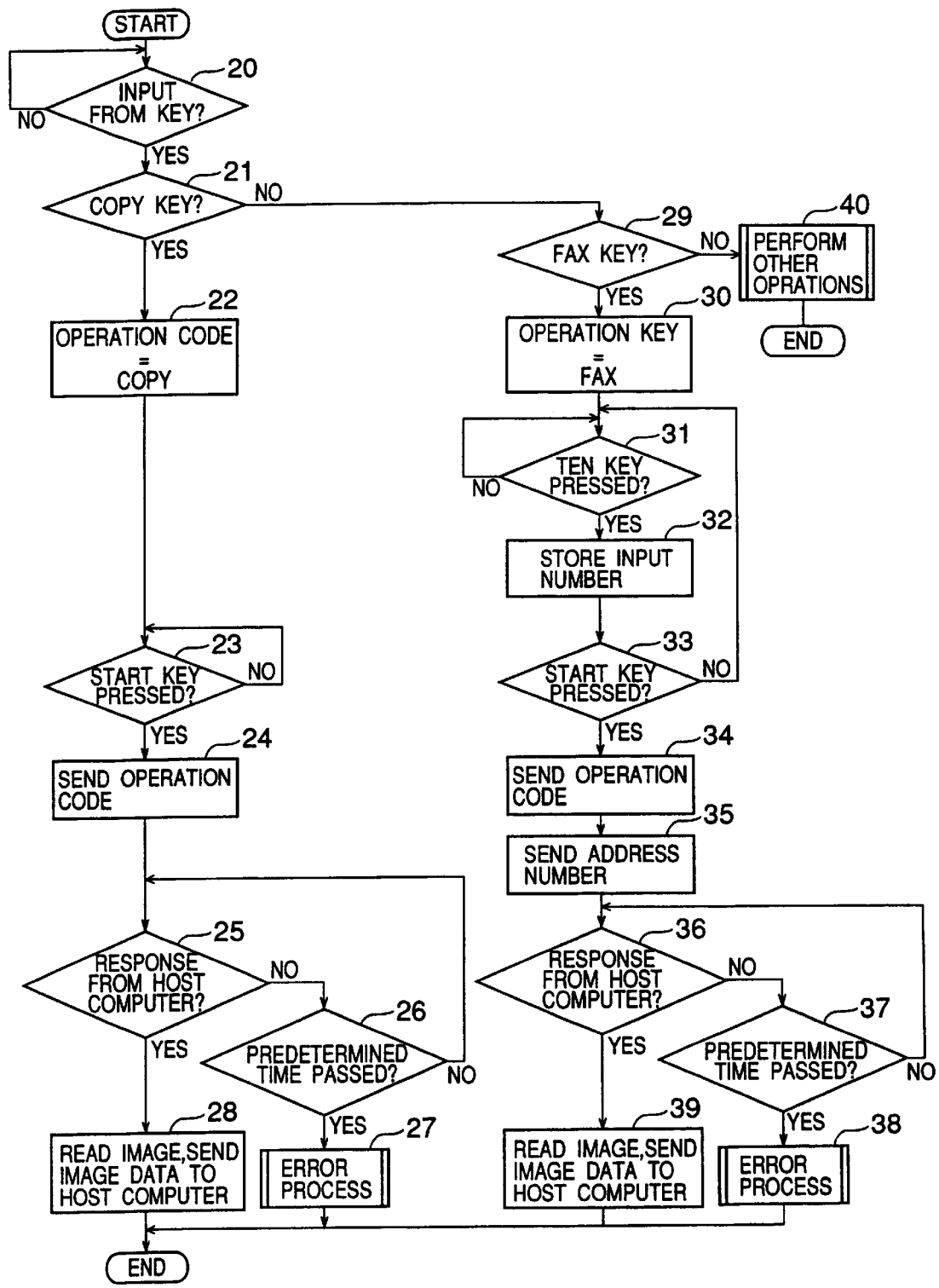
FIG. 4 is a flowchart of an operation performed by the image input device according to the first embodiment of the present invention.

When the operation shown in FIG. 4 is started, it is determined, in step 20, whether or not an instruction is input through the operational unit 18. That is, when the user sets an original document on the scanner unit 15, the scanner control unit 14 detects the original document and announces the detection of the original document to the system control unit 11. Then, the system control unit 11 sets a state of waiting for an instruction which designate an operation mode. When an instruction is input through the operational unit 18, it is determined, in step 21, whether or not the instruction is input through the copy key 18a. If it is determined that the instruction is input through the copy key 18a, the routine proceeds to step 22 so as to set "COPY" to the operation code.

In step 22, an operation code is set to "COPY". Then, in step 23, it is determined whether or not the start key 18c is pressed. If the start key 18c is pressed, the routine proceeds to step 24. In step 24, the operation code which was set to "COPY" is sent to the host computer 2. Then, it is determined, in step 25, whether or not a response is sent back from the host computer 2. If it is determined that a response is not received from the host computer 2, the routine proceeds to step 26. In step 26, it is determined whether or not a predetermined time period has passed. If it is determined that the predetermined time period has passed, it is considered that the driver for the image input device 1 is not booted up in the host computer 2 or power of the host computer 2 is not turned on. In such a case, the routine proceeds to step 27 so as to perform an error operation to display an error message, for example.

On the other hand, if it is determined, in step 21, that the pressed key is not the copy key 18a, the routine proceeds to step 29. In step 29, it is determined whether or not the pressed key is the FAX key 18b. If it is determined that the FAX key 18b is pressed, the routine proceeds to step 30 so as to set "FAX" to the operation code.

Thereafter, in step 31, it is determined whether or not one of the ten keys 18d is pressed. If it is determined that one of the ten keys 18d is pressed, the number corresponding to the pressed ten key is stored in a memory in step 32. Then, it is determined, in step 33, whether or not the start key 18c is pressed. If it is determined that the start key 18c is pressed, the operation code "FAX" is sent to the host computer 2 via the host I/F 19 in step 34. Then, in step 35, the address number (telephone number) which was input through the ten keys 18d is sent to the host computer 2.

Thereafter, it is determined, in step 36, whether or not a response is sent back from the host computer 2. If it is determined that a response is not sent from the host computer 2, the routine proceeds to step 37. In step 37, it is determined whether or not a predetermined time period has passed. If the predetermined time period has passed, it is determined that the driver for the image input device is not booted up in the host computer 2 or power of the host computer 2 is not turned on. In such a case, the routine proceeds to step 38 so as to perform an error operation to display an error message, for example.

If it is determined, in step 36, that a response is sent from the host computer 2, the routine proceeds to step 39. In step 39, an image of the original document is read and sent to the host computer 2.

Figure 5:
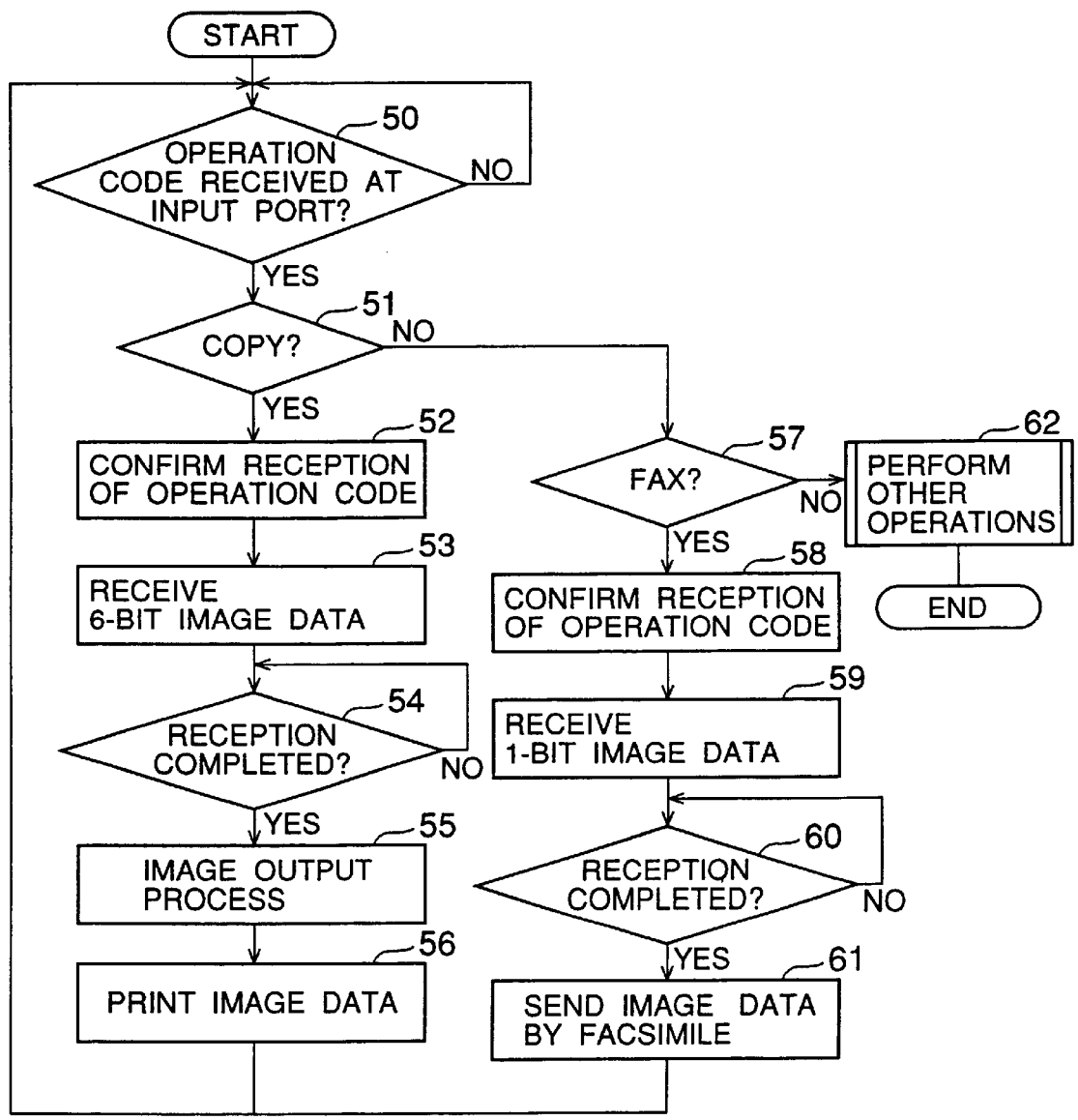
FIG. 5 is a flowchart of an operation performed by a host computer shown in FIG. 1

A description will now be given, with reference to FIG. 5, of an operation performed by the host computer 2.

In the host computer 2, a program which monitors an input of data received at an input port of the host computer 2 is operated, the input port being connected to the host I/F 19 of the image input device 1. The host computer 2 checks if the operation code, which is sent from the image input device 1 in step 24 or step 34 of FIG. 4, is received.

That is, in the host computer 2, it is determined, in step 50, whether or not the operation code is received at the input port. If the operation code is received, it is then determined, in step 51, whether or not the operation code is "COPY".

If it is determined that the operation code is not "COPY", the routine proceeds to step 57. In step 57, it is determined whether or not the operation code is "FAX". If it is determined that the operation code is not "FAX", the routine proceeds to step 62 in which an operation other than a copying operation or a facsimile transmission is performed. If it is determined, in step 57, that the operation code is "FAX", the routine proceeds to step 58 in which the reception of the operation code is confirmed.

Thereafter, in step 59, the image data is received from the image input device 1 while being subjected to a resolution converting process, a gradation level converting process and a compression process. The image data has a 1-bit gradient resolution (number of gradation levels is 2) since the image data is for facsimile transmission. It is then determined, is step 60, whether or not the reception of the image data is completed. The received image data is stored in the hard disc device.

After the reception of the image data is completed, the image data is processed, in step 61, so that the image data conforms to the requirement of the facsimile transmission. Thereafter, the host computer 2 controls the modem 4 to call the address number, and send the image data to the called terminal in step 61.

On the other hand, if it is determined, in step 51, that the operation code is "COPY", the routine proceeds to step 52 so as to confirm the reception of the operation code.

Thereafter, in step 53, the image data is received from the image input device 1 while being subjected to a resolution converting process, a gradation level converting process and a compression process. The image data has a 6-bit gradient resolution (number of gradation levels is 64). It is then determined, is step 54, whether or not the reception of the image data is completed. The received image data is stored in the hard disc device.

After the reception of the image data is completed, the received image data is processed, in step 55, so that the image data conforms to the requirement of the image output device 3. Then, in step 56, the image data is transferred to the image output device 3 and is printed out, and then the routine returns to step 50.

As mentioned above, in the first embodiment of the present invention, the image input device is provided with the copy key 18a and the FAX key 18b so as to announce to the host computer 2 as to which operation, a copying operation or a facsimile transmission, is requested by the user. Accordingly, the user is not required to work on the host computer 2 so as to instruct the desired operation to be performed.

Figure 6:
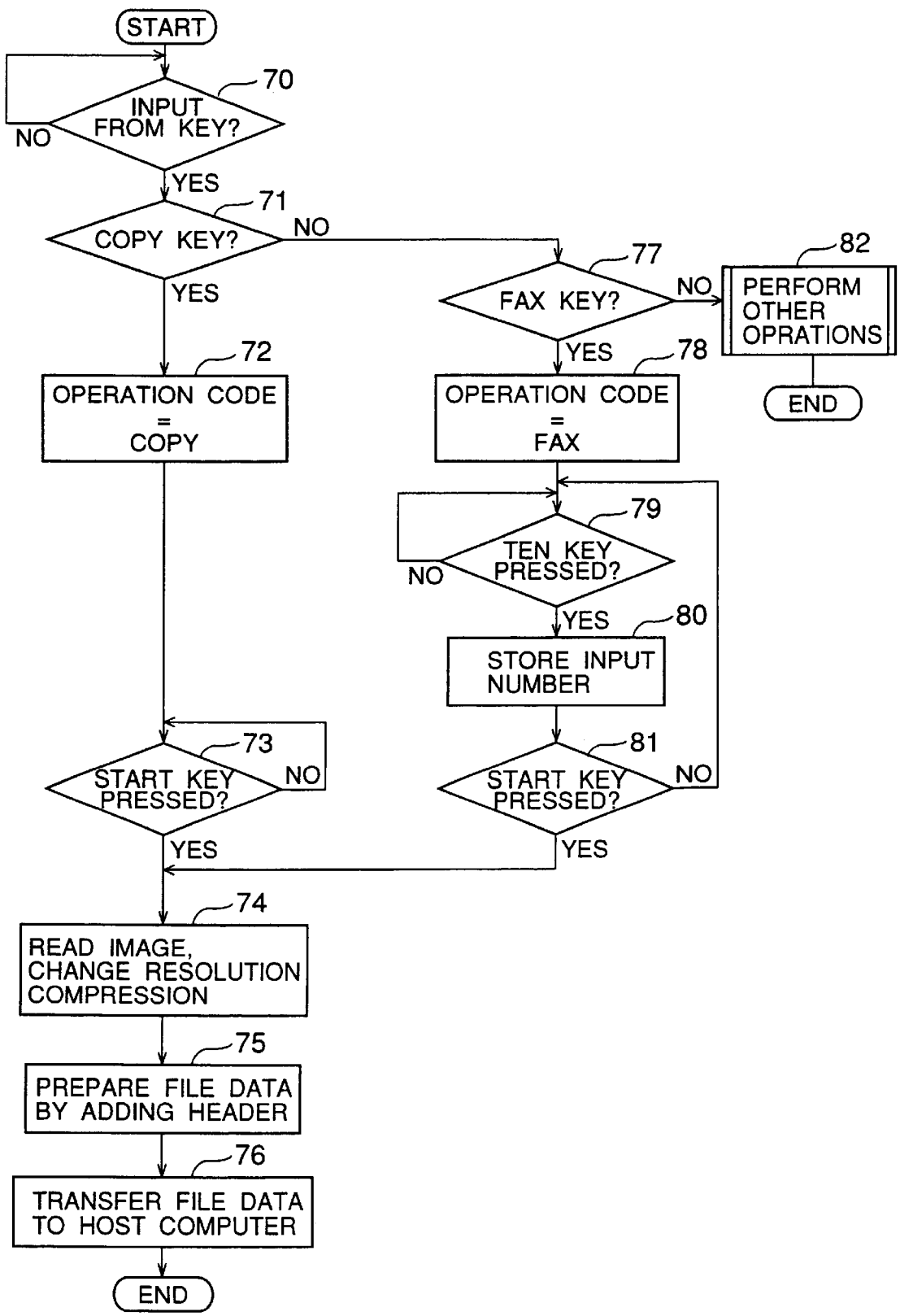
FIG. 6 is a flowchart of an operation performed by an image input device according to a second embodiment of the present invention.

A description will now be given, with reference to FIG. 6, of a second embodiment of the present invention. The structure of an image input device according to the second embodiment is the same as that of the first embodiment. FIG. 6 is a flowchart of an operation performed by the image input device 1 according to the second embodiment.

When the operation shown in FIG. 6 is started, it is determined, in step 70, whether or not an instruction is input through the operational unit 18. That is, when the user sets an original document on the scanner unit 15, the scanner control unit 14 detects the original document and announces the detection of the original document to the system control unit 11. Then, the system control unit 11 sets a state of waiting for an instruction which designate an operation mode. When an instruction is input through the operational unit 18, it is determined, in step 71, whether or not the instruction is input through the copy key 18a. If it is determined that the instruction is input through the copy key 18a, the routine proceeds to step 72 so as to set "COPY" to the operation code.

In step 72, an operation code is set to "COPY". Then, in step 73, it is determined whether or not the start key 18c is pressed. If the start key 18c is pressed, the routine proceeds to step 74. In step 74, the original document is read and the image data is converted to an appropriate resolution for the copying operation and an appropriate compression is applied to the image data. Then, in step 76, the image data is converted to file data having a header. Information which relates to the image data such as the operation code is included in the header of the file data. Then, the file data is transferred to the host computer 2 via the host I/F 19.

On the other hand, if it is determined, in step 71, that the pressed key is not the copy key 18a, the routine proceeds to step 77. In step 77, it is determined whether or not the pressed key is the FAX key 18b. If it is determined that the FAX key 18b is pressed, the routine proceeds to step 78 so as to set "FAX" to the operation code.

Thereafter, in step 79, it is determined whether or not one of the ten keys 18d is pressed. If it is determined that one of the ten keys 18d is pressed, the number corresponding to the pressed key is stored in a memory in step 80. Then, it is determined, in step 81, whether or not the start key 18c is pressed. If it is determined that the start key 18c is pressed, the routine proceeds to step 74. In step 74, the original document is read by the scanner unit 15 and the image data is converted to have an appropriate resolution for the facsimile transmission and an appropriate compression is applied to the image data. Then, in step 75, the image data is converted to the file data having the header. Information which relates to the image data such as the operation code is included in the header of the file data. Then, in step 76 the file data is transferred to the host computer 2 via the host I/F 19.

Figure 7:
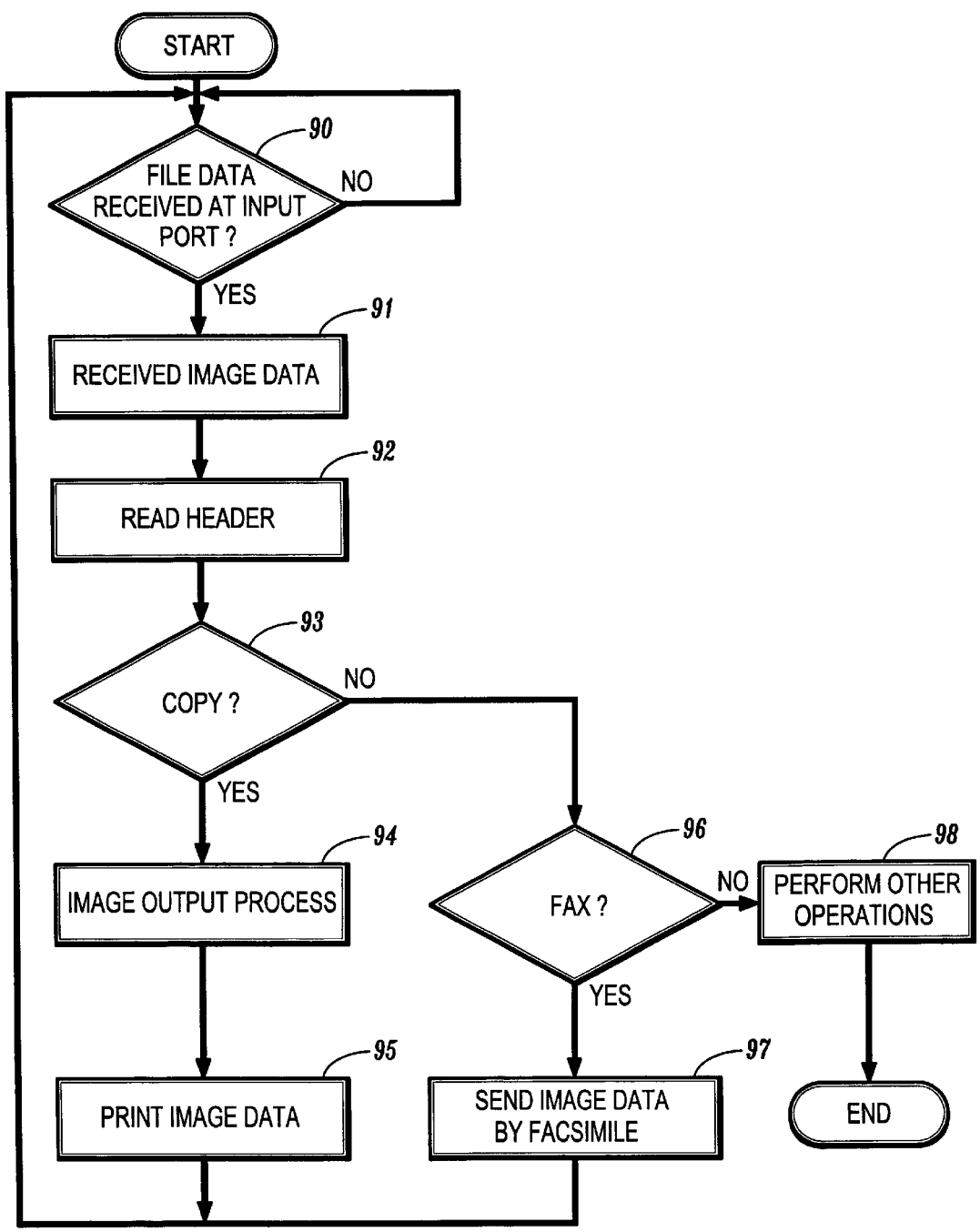
FIG. 7 is a flowchart of an operation performed by an host computer connected to the image input device according to the second embodiment of the present invention.

A description will now be given, with reference to FIG. 7, of an operation performed by the host computer 2 in the second embodiment.

In the host computer 2, a program which monitors an input of data received at an input port of the host computer 2 is operated, the input port being connected to the host I/F 19 of the image input device 1. The host computer 2 checks if the file data, which is sent from the image input device 1 in step 76 of FIG. 6, is received.

That is, in the host computer 2, it is determined, in step 90, whether or not the file data is received at the input port. If the file data is received at the input port, the host computer 2 receives the entire file data including the header in step 91. Then, in step 92, the header of the file data is read. It is then determined, in step 93, whether or not the operation code included in the header is "COPY".

If it is determined that the operation code is not "COPY", the routine proceeds to step 96. In step 96, it is determined whether or not the operation code is "FAX". If it is determined that the operation code is not "FAX", the routine proceeds to step 98 in which an operation other than a copying operation or a facsimile transmission is performed. If it is determined, in step 96, that the operation code is "FAX", the routine proceeds to step 97. Then, the host computer 2 controls the modem 4 to call the address number, and send the image data to the called terminal in step 97.

On the other hand, if it is determined, in step 93, that the operation code is "COPY", the routine proceeds to step 94. In step 94, the received image data is processed so that the image data conforms to the requirement of the image output device 3. Then, in step 95, the image data is transferred to the image output device 3 and is printed out, and then the routine returns to step 90.

As mentioned above, in the second embodiment of the present invention, the image input device 1 sends the image data to the host computer 2 by being converted into file data having a header which can contain information relating to the image data to be sent. Since the information included in the header of the file data includes the operation code which indicates the desired process, a copying operation or a facsimile transmission, the user is not required to work on the host computer so as to instruct which process should be performed for the image data transferred from the image input device.

Figure 8:
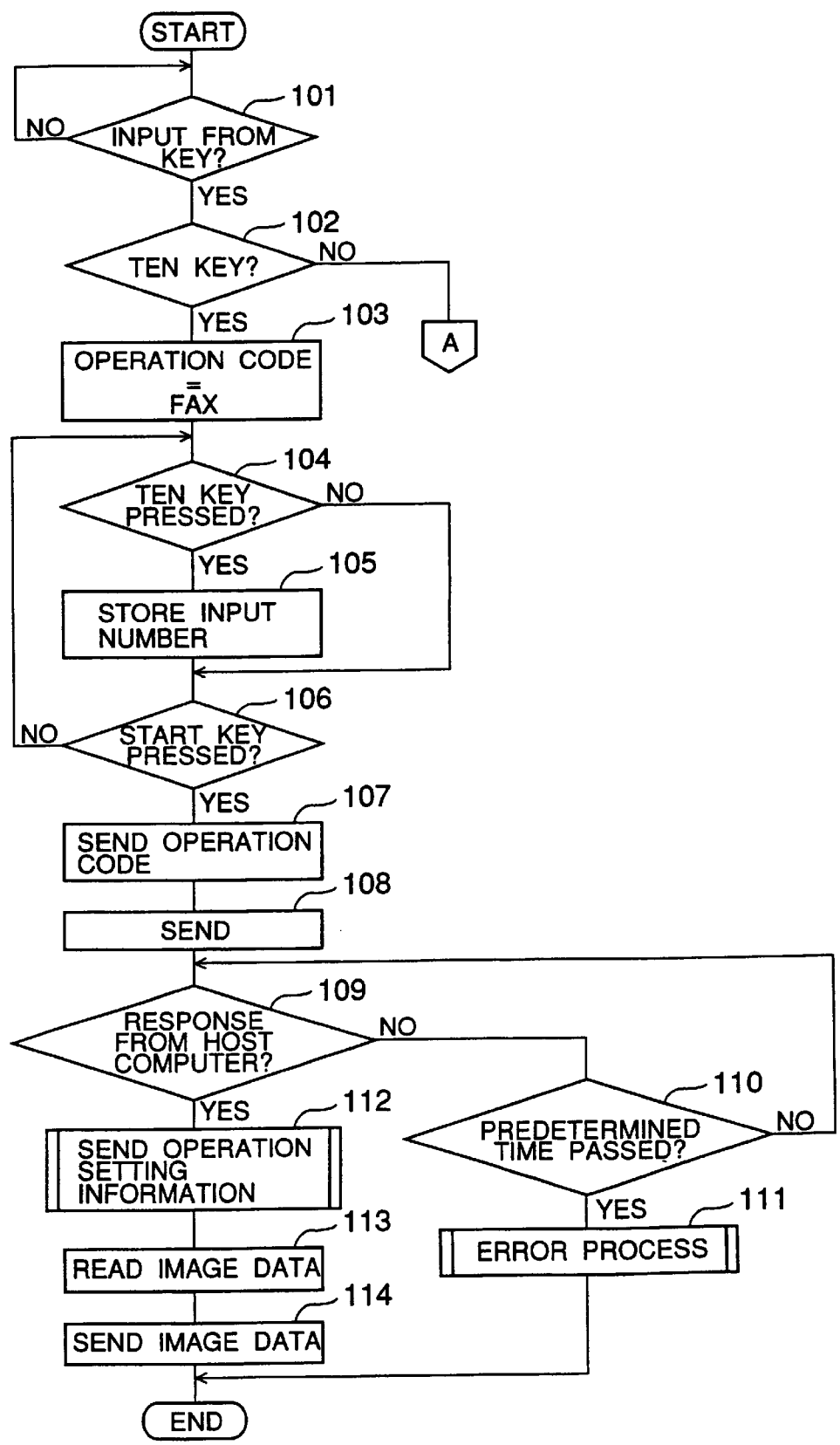
FIG. 8 is a part of a flowchart of an operation performed by an image input device according to a third embodiment of the present invention.
Figure 9:
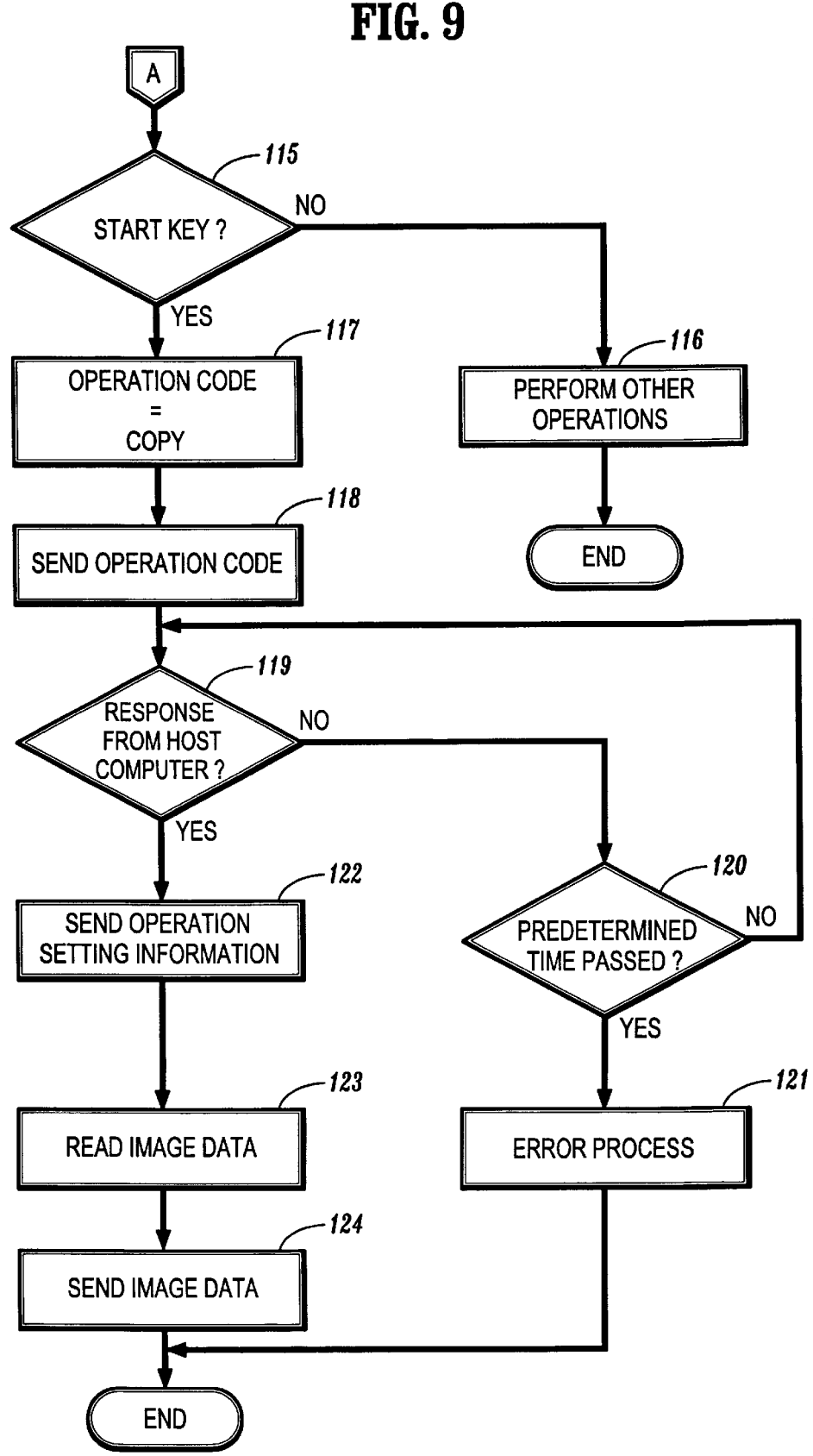
FIG. 9 is a part of the flowchart of the operation performed by the image input device according to the third embodiment of the present invention.

A description will now be given, with reference to FIGS. 8 and 9, of an image input device according to a third embodiment of the present invention. The structure of the third embodiment is similar to the structure of the above-mentioned first embodiment. FIGS. 8 and 9 are parts of a flowchart of an operation performed by the image input device according to the third embodiment of the present invention.

When the operation shown in FIGS. 8 and 9 is started, it is determined, in step 101, whether or not an instruction is input through the operational unit 18. That is, when the user sets an original document on the scanner unit 15, the scanner control unit 14 detects the original document and announce the detection of the original document to the system control unit 11. Then, the system control unit 11 sets a state of waiting for an instruction which designate an operation mode. When an instruction is input through the operational unit 18, it is determined, in step 102, whether or not the instruction is input through the ten keys 18d. If it is determined that the instruction is input through the ten keys 18d, the routine proceeds to step 103 so as to set "FAX" to the operation code.

Thereafter, in step 104, it is determined whether or not one of the ten keys 18d is pressed. If it is determined that one of the ten keys 18d is pressed, the number corresponding to the pressed ten key is stored in a memory in step 105. Then, it is determined, in step 106, whether or not the start key 18c is pressed. If it is determined that the start key 18c is pressed, the operation code "FAX" is sent to the host computer 2 via the host I/F 19 in step 107. Then, in step 108, the address number (telephone number) which was input through the ten keys 18d is sent to the host computer 2. The input of the operation code "FAX" and the address number is interpreted to indicate that the desired process requested by the user is a facsimile transmission.

Thereafter, it is determined, in step 109, whether or not a response is sent back from the host computer 2. If it is determined that a response is not sent from the host computer 2, the routine proceeds to step 110. In step 110, it is determined whether or not a predetermined time period has passed. If the predetermined time period has passed, it is determined that the driver for the image input device is not booted up in the host computer 2 or power of the host computer 2 is not turned on. In such a case, the routine proceeds to step 111 so as to perform an error operation to display an error message, for example.

If it is determined, in step 109, that a response is sent from the host computer 2, the routine proceeds to step 112. In step 112, device setting information is sent to the host computer 2. The device setting information is information that was stored in the ROM 12 as shown in FIG. 3.

A discussion will be made of a resolution and a number of gradation levels with respect to a facsimile transmission image and a copy image. In the facsimile transmission image, in most cases, the image comprises two intensity levels (number of gradation levels is 2), and a resolution is 200 dpi. On the other hand, a high image quality is required for the copy image which corresponds to 100% performance of the output system since communication cost is not needed for the copy image. That is, when use of the copy function is considered, the reading resolution of the scanner unit 15 should be 300 dpi, and the number of gradation levels should be 256. If the scanner unit 15 is fixedly set to this condition, an excessively large amount of image data is obtained for the facsimile transmission image. Accordingly, there is a problem in that it takes a long time for transmission of the image data obtained by the scanner unit 15.

In order to eliminate such a problem, in the present embodiment, the device setting information to be sent to the host computer is automatically switched as shown in FIG. 3 and in step 112 or step 122 in FIG. 8 or 9, respectively. That is, if the operation code is "COPY", the resolution of the image is set to 400 dpi for the primary scanning direction, 400 dpi for the secondary scanning direction and the number of gradation levels is set to 64. On the other hand, if the operation code is "FAX", the resolution of the image is set to 200 dpi for the primary scanning direction, 200 dpi for the secondary scanning direction and the number of gradation levels is set to 2.

Thereafter, in step 113, an image of the original document set in the scanner unit 15 is read. Then, in step 114, the image data converted by the image process encoding unit 16 is sent to the host computer 2 via the host I/F 19. In the image process encoding unit 16, the image data obtained by the scanner unit 15 is converted to image data with the resolution and number of gradation levels conforming to the device setting information set in step 112.

If it is determined, in step 102, that the pressed key is not the ten keys 18c, the routine proceeds to step 115 shown in FIG. 9. In step 115, it is determined whether or not the pressed key is the start key 18c. If it is determined that the pressed key is not the start key 18c, the routine proceeds to step 116 so as to perform an operation other than the copy operation and the facsimile operation, and then the routine is ended.

If it is determined, in step 115, that the pressed key is the start key 18c, the operation code is set to "COPY" in step 117. Then, in step 118, the operation code "COPY" is sent to the host computer 2 via the host I/F 19. The operation code "COPY" is interpreted to indicate a desired process requested by the user.

Thereafter, it is determined, in step 119, whether or not a response is sent back from the host computer 2. If it is determined that a response is not sent from the host computer 2, the routine proceeds to step 120. In step 120, it is determined whether or not a predetermined time period has passed. If the predetermined time period has passed, it is determined that the driver for the image input device is not booted up in the host computer 2 or power of the host computer 2 is not turned on. In such a case, the routine proceeds to step 121 so as to perform an error operation to display an error message, for example.

If it is determined, in step 119, that a response is sent from the host computer 2, the routine proceeds to step 122. In step 122, device setting information is sent to the host computer 2. The device setting information is information that was stored in the ROM 12 as shown in FIG. 3.

Thereafter, in step 123, an image of the original document set in the scanner unit 15 is read. Then, in step 124, the image data converted by the image process encoding unit 16 is sent to the host computer 2 via the host I/F 19. In the image process encoding unit 16, the image data obtained by the scanner unit 15 is converted to image data with the resolution and number of gradation levels conforming to the device setting information set in step 122.

As mentioned above, in the present embodiment, the determination as to which operation, facsimile operation or a copy operation, is requested by the user is made based on which key, start key 18c or a ten key 18d, is pressed first after the original document was set. That is, it is determined automatically that if one of the ten keys 18d is pressed first, the desired operation is a facsimile transmission, and if the start key 18c is pressed first, the desired operation is a copy operation.

Figure 10:
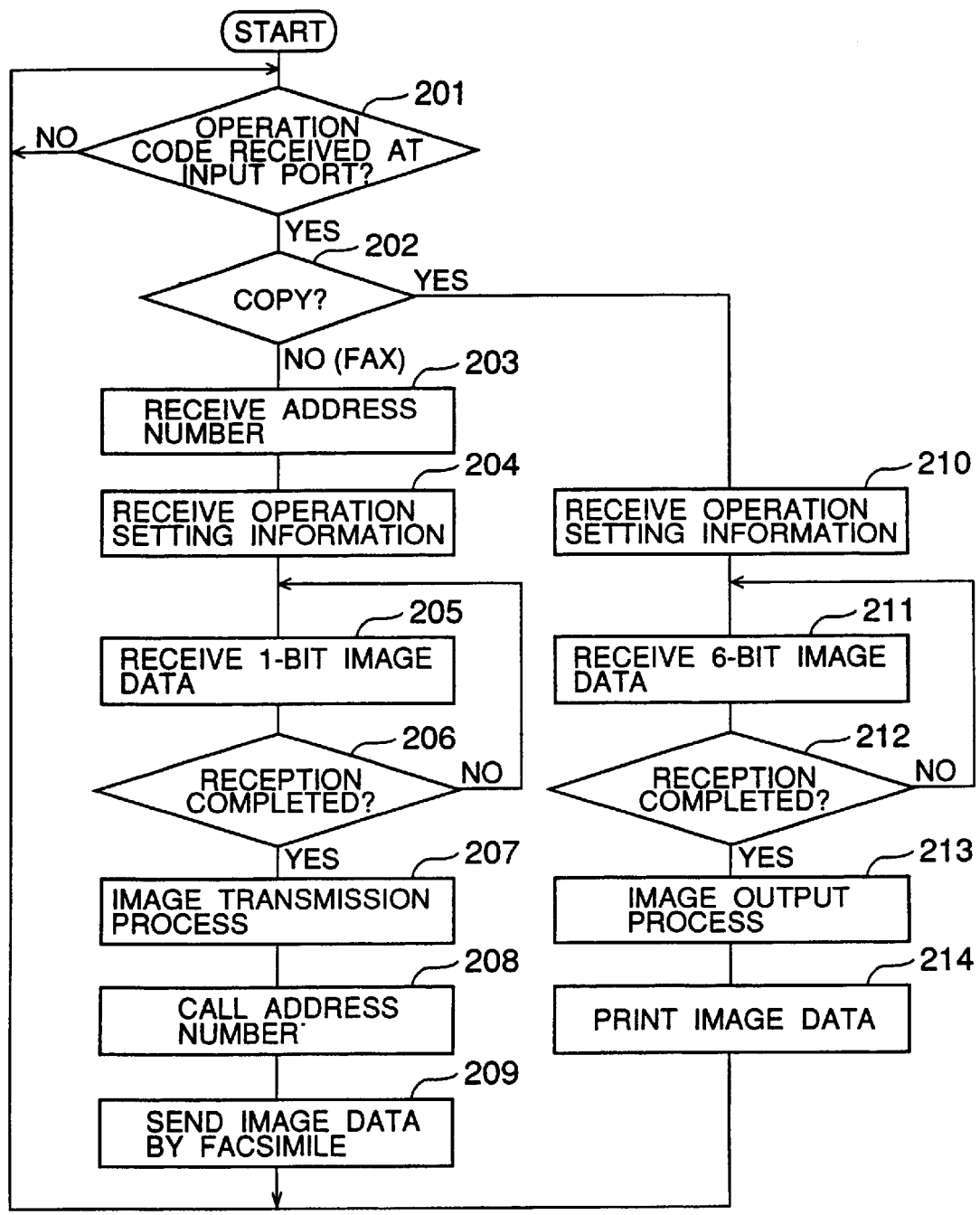
FIG. 10 is a flowchart of an operation performed by an host computer connected to the image input device according to the third embodiment of the present invention.

A description will now be given, with reference to FIG. 10, of an operation preformed by the host computer 2 in the present embodiment.

In the host computer 2, a program which monitors an input of data received at an input port of the host computer 2 is operated, the input port being connected to the host I/F 19 of the image input device 1. The host computer 2 checks if the operation code, which is sent from the image input device 1 in step 107 of FIG. 8 or step 118 of FIG. 9, is received.

That is, in the host computer 2, it is determined, in step 201, whether or not the operation code is received at the input port. If the operation code is received, it is then determined, in step 202, whether or not the operation code is "COPY".

If it is determined that the operation code is not "COPY", it can be determined that the received operation code is "FAX". In this case, the routine proceeds to step 203 to receive the address number (telephone number) sent from the image input device 1. Then, in step 204, the operation setting information is received. It should be noted that the process of step 203 corresponds to step 108 of FIG. 8, and the process of step 204 corresponds to step 122 of FIG. 9.

Thereafter, in step 205, the image data is received from the image input device 1 while being subjected to a resolution converting process, a gradation level converting process and a compression process in accordance with the operation setting information received in step 204. The image data has a 1-bit gradient resolution (number of gradation levels is 2). It is then determined, is step 206, whether or not the reception of the image data is completed. The received image data is stored in the hard disc device. These operations relate to the process of step 114 of FIG. 8.

After the reception of the image data is completed, the image data is processed, in step 207, so that the image data conforms to the requirement of the facsimile transmission. Thereafter, the host computer 2 controls the modem 4 to call the address number received in step 203. Then, in step 209, the image data is sent to the called terminal via the modem 4, and the routine returns to step 201.

On the other hand, if it is determined, in step 202, that the operation code is "COPY", the routine proceeds to step 210. In step 210, the operation setting information is received. The process of step 210 relates to the process of step 122 of FIG. 9.

Thereafter, in step 211, the image data is received from the image input device 1 while being subjected to a resolution converting process, a gradation level converting process and a compression process in accordance with the operation setting information received in step 210. The image data has a 6-bit gradient resolution (number of gradation levels is 64). It is then determined, is step 212, whether or not the reception of the image data is completed. The received image data is stored in the hard disc device. These operations relate to the process of step 124 of FIG. 9.

After the reception of the image data is completed, the received image data is processed, in step 213, so that the image data conforms to the requirement of image output device 3. Then, in step 214, the image data is transferred to the image output device 3 and is printed out, and then the routine returns to step 201.

As mentioned above, in the present embodiment, the image input device 1 automatically determines the desired process by the user based on the information related to the image data to be sent to the host computer 2. Thus, there is no need for the user to work on the host computer 2 so as to instruct which operation is to be performed after the user has set the original document in the image input device 1. Thus, the operation done by the user is simplified and convenient.

It should be noted that, although, in the above-mentioned embodiments, the image input device 1 has only the image inputting function, the image input device 1 may be replaced by a device having both a printing function and a scanning function. Additionally, the operation code set by the image input device 1 is not limited to "FAX" and "COPY". That is, for example, other operation codes such as, for example, "FILING" may be set so as to file the image data transferred to the host computer 2.

The present invention is not limited to the specifically disclosed embodiments, and variations and modifications may be made without departing from the scope of the present invention.

What is claimed is:

1. An image input device adapted to be connected to a host computer so as to transfer image data to said host computer, said image input device comprising:

scanning means for inputting the image data and for inputting an instruction for directing said host computer to perform at least one of a plurality of operations on the image data transmitted by said image input device to said host computer; and means for setting an operation code which represents contents of the instruction so that said operation code is sent to said host computer so that said host computer can receive the operation code and image data and perform the at least one of the plurality of operations indicated by the operation code without any direct user input to the host computer.

2. The image input device as claimed in claim 1, further comprising:

means for setting at least one of a resolution and a number of gradation levels of the image data in accordance with the contents of said instruction; and means for announcing to said host computer said one of the resolution and the number of gradation levels set by said means for setting.

3. The image input device as claimed in claim 1, further comprising means for preparing file data which comprises the image data and a header so that said file data is sent to said host computer, said header including an operational code which indicates the contents of said instruction.

4. The image input device as claimed in claim 3, wherein said header further includes information with respect to at least one of a resolution and a number of gradation levels of the image data.

5. The image input device as claimed in claim 1, wherein said means for inputting comprises a copy key and a facsimile key, said copy key being pressed when the image data is for a copying operation, said facsimile key being pressed when the image data is for a facsimile transmission.

6. An image input device adapted to be connected to a host computer so as to transfer image data to said host computer, said image input device comprising:

a plurality of keys including ten keys representing a number from zero to nine, said ten keys being used by a user for inputting an address number of a remote terminal to which said image data is to be transferred by a facsimile transmission;

determination means for determining, when at least one of the plurality of keys is pressed before a read operation, whether the at least one pressed key includes at least one of said ten keys, and determining that an operation to be applied to the image data is a facsimile operation if it is determined that the at least one pressed key includes at least one of said ten keys and the operation to be applied to the image data is a copying operation if it is determined that the at least one pressed key does not include at least one of said ten keys; and means for setting an operation code and sending the operation code to the host computer announcing to said host computer that said user requests said facsimile operation upon said determination means determining that any one of said ten keys is pressed, and that said user requests said copying operation upon said determination means determining that the reading operation is started without an input from said ten keys, said host computer performing a facsimile operation or a copying operation based on the operation code sent from said image input device.

7. An image input device adapted to be connected to a host computer so as to transfer image data to said host computer, said image input device comprising:

scanning means for inputting the image data;

an operational unit for inputting an instruction for directing said host computer to perform at least one of a plurality of operations on the image data transmitted by said image input device to said host computer; and a code unit for setting an operation code which represents contents of the instruction so that said operation code is sent to said host computer so that said host computer can receive the operation code and image data and perform the at least one of the plurality of operations indicated by the operation code without any direct user input to the host computer.

8. An image input device adapted to be connected to a host computer so as to transfer image data to said host computer, said image input device comprising:

a plurality of keys including ten keys representing a number from zero to nine, said ten keys being used by a user for inputting an address number of a remote terminal to which said image data is to be transferred by a facsimile transmission;

a determination unit for determining, when at least one of the plurality of keys is pressed before a read operation, whether the at least one pressed key includes at least one of said ten keys, and determining that an operation to be applied to the image data is a facsimile operation if it is determined that the at least one pressed key includes at least one of said ten keys and the operation to be applied to the image data is a copying operation if it is determined that the at least one pressed key does not include at least one of said ten keys; and an operational unit for announcing to said host computer that said user requests said facsimile operation upon said determination unit determining that any one of said ten keys is pressed, and that said user requests said copying operation upon said determination unit determining that the reading operation is started without an input from said ten keys.

9. An image input device adapted to be connected to a host computer so as to transfer image data to said host computer, said image input device comprising:

scanning means for inputting the image data and for inputting an instruction for directing said host computer to perform at least one of a plurality of operations on the image data transmitted by said image input device to said host computer;

means for setting an operation code which represents contents of the instruction so that said operation code is sent to said host computer prior to sending the image data so that said host computer can receive the operation code and image data and perform the at least one of the plurality of operations indicated by the operation code without any direct user input to the host computer;

a plurality of keys including ten keys representing a number from zero to nine, said ten keys being used by a user for inputting an address number of a remote terminal to which said image data is to be transferred by a facsimile transmission;

determination means for determining, when at least one of the plurality of keys is pressed before a read operation, whether the at least one pressed key includes at least one of said ten keys, and determining that an operation to be applied to the image data is a facsimile operation if it is determined that the at least one pressed key includes at least one of said ten keys and the operation to be applied to the image data is a copying operation if it is determined that the at least one pressed key does not include at least one of said ten keys; and means for setting an operation code and sending the operation code to the host computer announcing to said host computer that said user requests said facsimile operation upon said determination means determining that any one of said ten keys is pressed, and that said user requests said copying operation upon said determination means determining that the reading operation is started without an input from said ten keys, said host computer performing a facsimile operation or a copying operation based on the operation code sent from said image input device.

10. An image input device adapted to be connected to a host computer so as to transfer image data to said host computer, said image input device comprising:

scanning means for inputting the image data;

an operational unit for inputting an instruction for directing said host computer to perform at least one of a plurality of operations on the image data transmitted by said image input device to said host computer;

a code unit for setting an operation code which represents contents of the instruction so that said operation code is sent to said host computer prior to sending the image data so that said host computer can receive the operation code and image data and perform the at least one of the plurality of operations indicated by the operation code without any direct user input to the host computer;

a plurality of keys including ten keys representing a number from zero to nine, said ten keys being used by a user for inputting an address number of a remote terminal to which said image data is to be transferred by a facsimile transmission;

a determination unit for determining, when at least one of the plurality of keys is pressed before a read operation, whether the at least one pressed key includes at least one of said ten keys, and determining that an operation to be applied to the image data is a facsimile operation if it is determined that the at least one pressed key includes at least one of said ten keys and the operation to be applied to the image data is a copying operation if it is determined that the at least one pressed key does not include at least one of said ten keys; and the operational unit setting an operation code and sending the operation code to the host computer announcing to said host computer that said user requests said facsimile operation upon said determination unit determining that any one of said ten keys is pressed, and that said user requests said copying operation upon said determination unit determining that the reading operation is started without an input from said ten keys, said host computer performing a facsimile operation or a copying operation based on the operation code sent from said image input device.

11. An image input device adapted to be connected to a host computer so as to transfer image data to said host computer, said image input device comprising:

scanning means for inputting the image data and for inputting an instruction for directing said host computer to perform at least one of a plurality of operations on the image data transmitted by said image input device to said host computer;

means for preparing file data which comprises the image data and a header so that said file data is sent to said host computer, said header including an operational code which indicates the contents of said instruction so that said host computer can receive the operation code and image data and perform the at least one of the plurality of operations indicated by the operation code without any direct user input to the host computer.

12. An image input device adapted to be connected to a host computer so as to transfer image data to said host computer, said image input device comprising:

scanning means for inputting the image data and for inputting an instruction for directing said host computer to perform at least one of a plurality of operations on the image data transmitted by said image input device to said host computer;

means for announcing contents of the instruction to said host computer; and means for preparing file data which comprises the image data and a header so that said file data is sent to said host computer, said header including an operational code which indicates the contents of said instruction and information with respect to at least one of a resolution and a number of gradation levels of the image data so that said host computer can receive the operation code and image data and perform the at least one of the plurality of operations indicated by the operation code without any direct user input to the host computer.

13. The method of transferring image data to a host computer comprising the steps of:

inputting the image data and inputting an instruction for directing said host computer to perform at least one of a plurality of operations on the image data transmitted by said image input device to said host computer; and setting an operation code which represents contents of the instruction so that said operation code is sent to said host computer so that said host computer can receive the operation code and image data and perform the at least one of the plurality of operations indicated by the operation code without any direct user input to the host computer.

* * * * *